July 28, 1953 C. R. CAMPBELL, JR 2,646,676
SELECTIVE STAKING MACHINE
Filed March 20, 1951 8 Sheets-Sheet 1

Fig.1

Inventor:
Charles R. Campbell, Jr.
By his Attorney

July 28, 1953 C. R. CAMPBELL, JR 2,646,676
SELECTIVE STAKING MACHINE
Filed March 20, 1951 8 Sheets-Sheet 2

Fig. 2

Inventor
Charles R. Campbell, Jr.
By his Attorney

July 28, 1953

C. R. CAMPBELL, JR 2,646,676

SELECTIVE STAKING MACHINE

Filed March 20, 1951

Inventor:
Charles R. Campbell, Jr.
By his Attorney

July 28, 1953 — C. R. CAMPBELL, JR — 2,646,676
SELECTIVE STAKING MACHINE
Filed March 20, 1951 — 8 Sheets-Sheet 4

Inventor:
Charles R. Campbell, Jr.
By his Attorney

Fig. 7

Inventor:
Charles R. Campbell, Jr.
By his Attorney

Inventor:
Charles R. Campbell, Jr.
By his Attorney

July 28, 1953  C. R. CAMPBELL, JR  2,646,676
SELECTIVE STAKING MACHINE
Filed March 20, 1951  8 Sheets-Sheet 7

Inventor:
Charles R. Campbell, Jr.
By his Attorney

July 28, 1953   C. R. CAMPBELL, JR   2,646,676
SELECTIVE STAKING MACHINE
Filed March 20, 1951   8 Sheets-Sheet 8

Fig. 16

Inventor:
Charles R. Campbell, Jr.
By his Attorney

Patented July 28, 1953

2,646,676

UNITED STATES PATENT OFFICE 2,646,676

SELECTIVE STAKING MACHINE

Charles R. Campbell, Jr., Beverly, Mass., assignor to United Shoe Machinery Corporation, Flemington, N. J., a corporation of New Jersey Application March 20, 1951, Serial No. 216,636

8 Claims. (Cl. 69—34)

This invention relates to machines for treating hides and skins, and more particularly to machines for staking leather "selectively" by utilizing direct or freely discharging cylindrical work rolls having cooperative but non-contacting blades. While the invention is hereinafter illustrated as embodied in a machine for performing full width staking operations upon tanned hides and skins, it will be understood that in various novel aspects it is not limited to use in machines of the type herein illustrated.

The combination of special feed rolls with work rolls having helical ribs for staking leather as disclosed herein is claimed in the copending application for Letters Patent of the United States Serial No. 283,736, filed April 22, 1952, in the name of Charles R. Campbell, Jr.

The primary purpose of staking operations is to soften leather after drying by breaking up the cohesion between fibres and thereby generally to improve its workability without detracting from its strength and appearance and without making it limp and lacking in tone. The procedure usually preferred for reducing the stiffness of a workpiece is that of flexing the hide or skin while it is being subjected to tension over a staking tool. The degree of tension created ahead of the staking tool in present full width machines is theoretically constant and independent of the initial stiffness of the workpiece. Since an individual hide or skin to be treated usually differs considerably in the thickness and stiffness of its several portions, a more rigorous pulling and bending action is highly desirable in certain of its portions and, in fact, is required in order to obtain increased uniformity of feel of the leather. In present commercial practice the degree of staking action applied to particular portions of any workpiece depends largely, if not entirely, on the discretion of a skilled operator who is simultaneously concerned with the nature of the work as well as the feeding and controlling of his machine. The operator of a clamp staker, for example, controls the staking tension as applied by tool pressure over successive narrow paths of about 6" in width. He must make numerous reciprocal strokes with the working tool from a central portion to a margin and such sweeps, in view of the very irregular contour of a hide or skin, overlap to considerable extent, especially in the central portion. By using the means of "selective staking" as herein proposed, i. e. requiring a full width staking machine automatically to tension the several portions of each workpiece in proportion to their initial stiffness, the burden on an operator is relieved and a high rate of production of rather uniformly pliant hides and skins can be obtained.

A machine capable of selective staking preferably should have capacity both to treat the entire spread width of a heavy stiff hide or of a relatively light skin, and also to treat the thickness and thinnest portions of a workpiece with appropriate tension. Also, the tension exerted upon the sometimes weaker marginal portions of a workpiece as it is fed into or out of the machine must not be such as to effect either tearing or creasing. Moreover, precaution is normally to be exercised that over-staking of any portion be avoided since, unlike under-staking, it cannot be corrected. Prior to the present invention, rolls with cooperative interacting blades have been tried for carrying out the staking operation and such staking tools have simultaneously bent and pulled parts of a workpiece but they have not produced a uniform feel or softness in all parts of a hide or skin, their failure seemingly being attributable to their inability to produce flexures under different tensions that were nicely controlled by the initial localized stiffness in the work portions themselves.

It is therefore a general object of this invention to provide an improved full width leather treating machine which shall be capable of selectively staking hides or skins. Another object of the invention is to provide an improved staking machine of the rotary blade type which shall be relatively simple in construction yet be capable of a high output of hides or skins having a uniform feel.

Pursuant to these objects and in accordance with one feature, the invention comprises in combination a pair of cooperative work rolls both having large circumferences provided respectively with rigid blades arranged in groups spaced apart circumferentially of each roll the work-engaging ends of the blades of one roll being sharp and those of the other being relatively blunt or rounded and together affording such a large number of directional reversals and depth of non-contacting interengagements as to provide the work with a long, tortuous treatment passage therebetween, and feed rolls adjacent to the bite of said work rolls on their charge side and rotatable at a lower peripheral speed progressively to spread the work as it is tensioned by the coaction of said work rolls.

Still another feature of the invention is the combination of a pair of cooperatively related staking rolls having grouped interacting blades arranged helically, said blades being in units of three or more grouped throughout their length and, adjacent to their bite on the feeding side, feed controlling means comprising a pair of feed-retarding rolls, and means for driving both sets of rolls at unequal peripheral speeds.

These and other important features of the invention and novel combinations of parts will now be described in detail, reference being had to the accompanying drawings in which.

Figure 1:
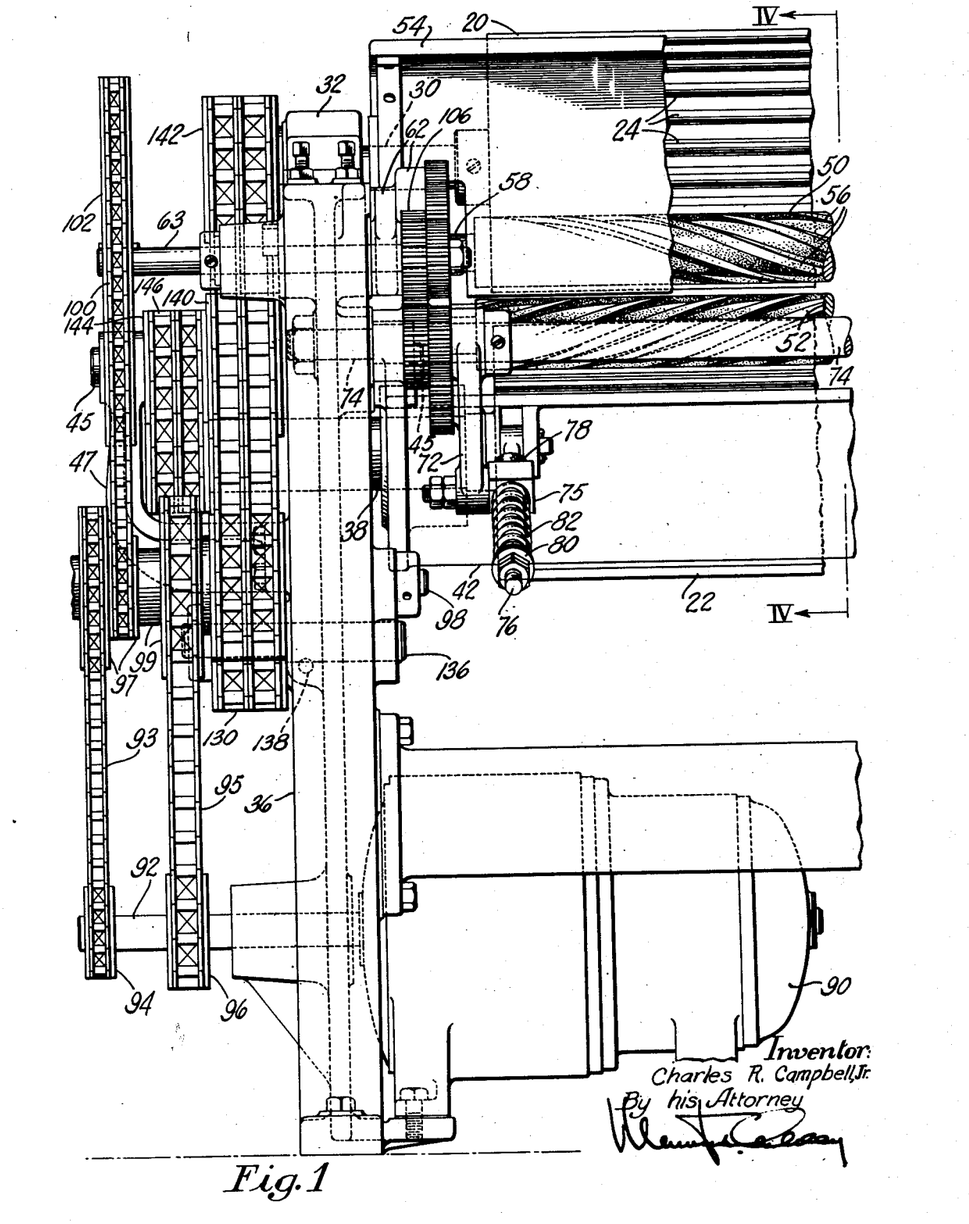
Fig. 1 is a front elevation (as viewed by an operator) of the left side of a non-through feed staking machine, a portion of the machine being broken away to reveal construction detail.
Figure 2:
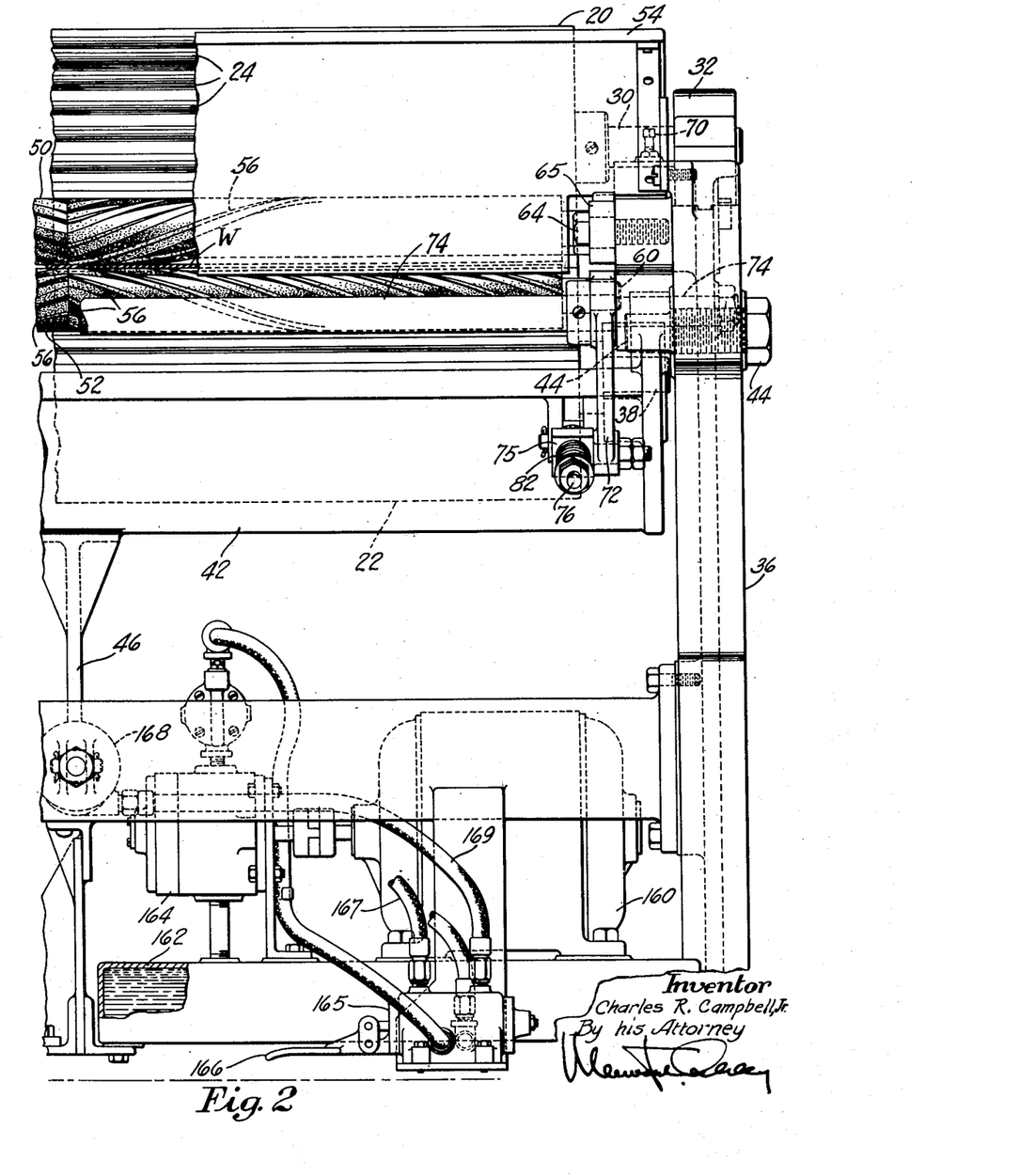
Fig. 2 is a front elevation of the right side of the machine partly shown in Fig. 1, a portion being broken away, and showing the lower work roll raised to its operating position.
Figure 3:
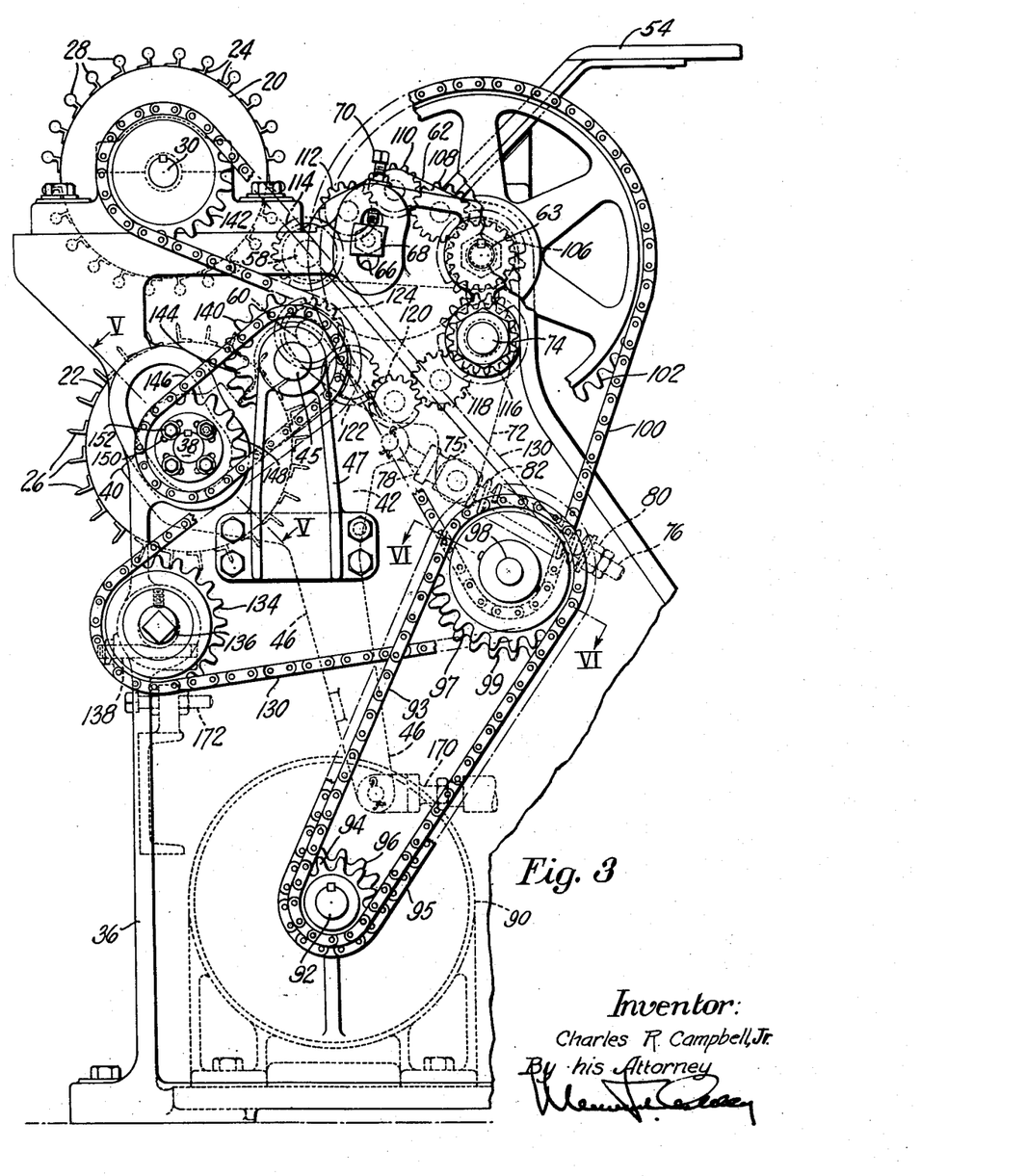
Fig. 3 is a left end elevation of the machine, portions being broken away the better to reveal construction details.

The staking machine herein disclosed is illustrated and described as provided with different pairs of work treating rolls each of which is constructed and arranged to stake leather "selectively." As seen in Figs. 1 and 2 the machine is shown as provided with work treating members comprising a pair of rotary cooperative rolls 20, 22 (both preferably being of larger diameter than heretofore used, i. e. about 10–12 inches or more in O. D., to afford a large area of chordal mesh) provided with spaced straight blades 24, 26, respectively, extending lengthwise thereof and having a generally L-shaped cross section. The bases of the blades may be welded or otherwise affixed to the rolls or, if desired, the blades may be machined on the rolls or even caulked therein. In contrast to some types of staking rolls the blades 24, 26 do not touch but are positioned to interengage without contact when the rolls 20, 22 are in operative position. This is to say that the respective working blades of one roll are positioned to be disposed centrally in the spaces between adjacent blades on the other roll. As best seen in Fig. 3 the blades 24 of the roll 20 have well-rounded or cylindrical-shaped work-engageable ends 28 and are adapted to engage the grain side of leather. One form of construction for rounding these ends or edges 28 is to fabricate sheet brass, a radius of $\frac{9}{32}$ inch being successful, for example, in avoiding grain boarding. The blades 26 of the lower roll 22 are adapted to engage the flesh side of a workpiece and are preferably quite pointed and spaced relatively to the edges 28 to provide a multiple bending involving sharp directional reversals of a workpiece. The number of blades provided on each work roll is determined by the minimum number of directional reversals or flexures required to build up workpiece tension adequate for staking the heaviest skins, as hereinafter described. Trial has indicated that with work rolls of the proposed large diameter, about 24 to 32 blades per roll when spaced completely about a circumference—and with corresponding intervals (less than 1½" but more than ½") if not occupying an entire perimeter—are preferred. Also a desirable number of passes of a blade tip per point on a workpiece surface has been found to be about four or five.

As seen in Figs. 1 and 2 the roll 20 has its shaft 30 mounted in bearings 32 carried at each end of the roll 20, said bearings being fixedly mounted on the frame 36 of the machine. The lower work treating roll 22 has its shaft 38 mounted at each end in bearing blocks 40 respectively secured to the opposite and upper ends of a swingable member 42 that is pivotally supported by a stud 44 (Fig. 2) threaded in the frame 36 and a stub-shaft 45 (Figs. 1 and 3) having bearings in the frame and a bracket 47. Hydraulic mechanism subsequently to be explained is pivotally connected to a central dependent arm 46 of the member 42 and is effective to raise or lower the roll 22 with its blades 26 relative to the roll 20.

For the purpose of conveniently and properly feeding a workpiece W (Fig. 7) to the bite of the rolls 20 and 22 there is provided a pair of cylindrical rolls 50 and 52 and an inclined worktable 54. The latter is secured to the front of the machine frame 36 and is adapted to conduct a full width hide or skin to the bite of the rolls 50, 52 which are preferably covered with a resilient rubber or rubber composition. These feed rolls are alike in construction, their rubber surfaces having the same number of thick, flat-topped ribs or lands 56 extending helically and with opposite lead from points substantially midway of the length of the rolls. The ribs 56 on one half of a roll are preferably staggered from those on the other half to avoid creasing or bunching the work. It should be noted (Fig. 7) that the ribs 56 of each roll do not mesh with those of the other, but are arranged in phase and rotated so that their peripheral surfaces cooperate in gripping opposite sides of successive segments of the workpiece W. The rolls 50, 52 are respectively affixed to shafts 58, 60 and driven by means to be described at a peripheral speed less than that of the work rolls 20, 22.

Figure 4:
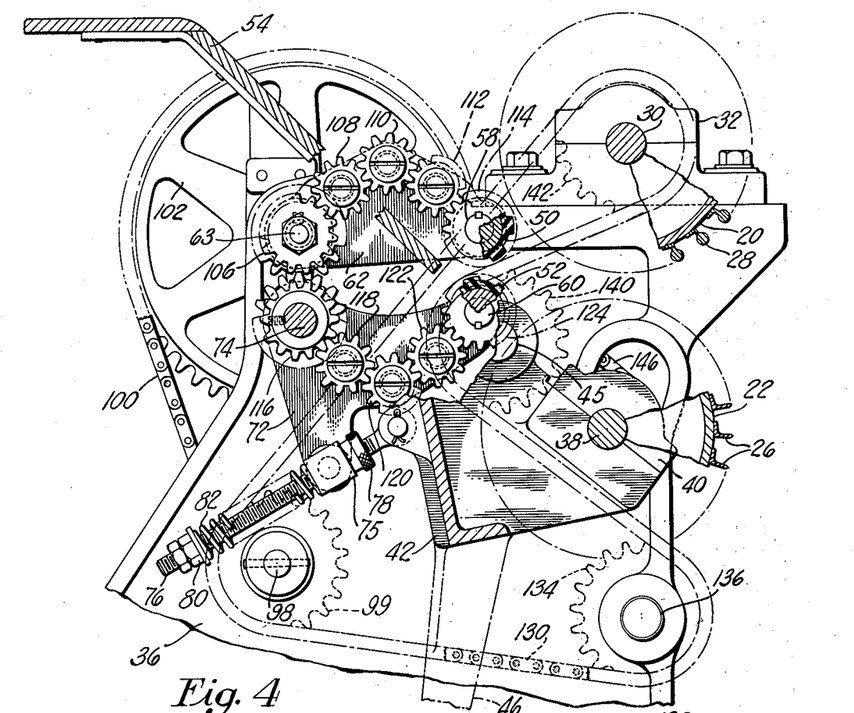
Fig. 4 is a vertical section taken on the line IV—IV of Fig. 1 and showing the staking rolls separated.

Advantageously, the mounting of the shafts 58, 60 is such as to permit easy adjustment of the pressure exerted by the rolls 50, 52 on the workpiece W and they are automatically separable after lowering of the work roll 22 as will hereinafter been seen. An end of the shaft 58 is provided with a bearing journaled in one end of a gear plate 62 (Figs. 1, 3 and 4) pivotally mounted at its other end on a stub shaft 63 journaled in the machine frame. The other end of the shaft 58 is journaled in an arm 65 (Fig. 7) fulcrumed on a stub shaft 64. The plate 62 is adjustable as to its upper limits of pivotal movement suitably to maintain operating pressure of the roll 50 on different types of work. For that purpose a vertical arcuate slot 69 in the frame 36, best seen in Fig. 7, slidably accommodates a stop block 68 engageable with the bottom of an adjusting bolt 70 threaded in the frame. The block 68 is bolted to the plate 62. The shaft 60 has end bearings in the corresponding arms of a pair of bell cranks 72 pivotally secured to the frame 36 by a tie rod 74 (Figs. 1 and 2). Each lower end of the other arms of the bell cranks 72 pivotally carries a trunnion block 75 having a bore to receive a threaded eye bolt 76 connected to the member 42. The respective eye bolts 76 adjustably carry threaded stop collars 78 and 80, the latter bearing on a spring 82 abutting the block 74.

Figures 5, 6:
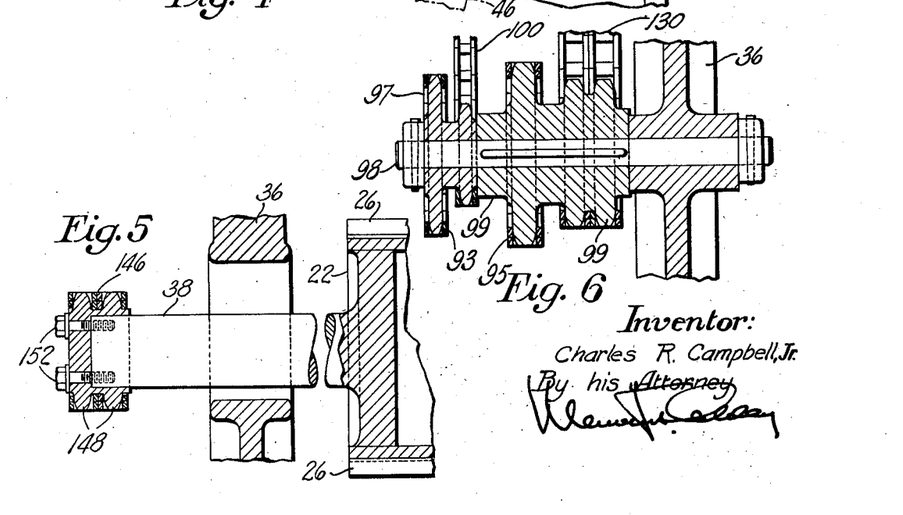
Fig. 5 is a section taken on the line V—V of Fig. 3.
Fig. 6 is a section taken on the line VI—VI of Fig. 3.

Power for driving the work and feed rolls 20, 22 and 50, 52, respectively, in fixed speed ratio is provided by an electric motor 90 (Figs. 1 and 3) bolted to the frame 36 and having an armature shaft 92. Fixedly mounted on the shaft 92 are sprockets 94 and 96 respectively having chain driving connections 93, 95 with sprockets 97, 99 mounted on a common stub shaft 98 journaled in the frame 36. As best seen in Fig. 6 the sprocket 97 is freely rotatable on the shaft 98 and the sprocket 99 is keyed thereto. Means (Figs. 3 and 4) for driving the feed rolls 50, 52 comprise a chain 100 having operative connection with the sprocket 97 and a large sprocket 102, the large sprocket 102 being fixedly mounted on one end of a short shaft 63 which carries inboard a relatively small drive gear 106. The latter drives meshed gears 108, 110, 112 and 114 supported by the gear plate 62, the gear 114 being mounted on the feed roll shaft 58. Also driven by the gear 106 are meshed gears 116, 118, 120, 122 and 124 (Figs. 3 and 4) rotatably supported by an arm of the bell crank 72, the gear 124 being mounted on the feed roll shaft 60.

The means for driving the work rolls 20, 22 comprise an endless chain 130 in mesh with the sprocket 97 on the stub shaft 98 and meshing with a sprocket 134 rotatably mounted on an axle 136 (Figs. 3 and 4) having bearings in the frame 36 at the rear of the machine. For the purpose of taking up, or slacking off, on the chain 130, if need be, the axle 136 has an eccentric portion engageable with a binder post 138 (Fig. 3) threaded into the frame. The endless chain 130 meshes with a sprocket 140 rotatable on the stubshaft 45, with a sprocket 142 keyed to the shaft 30, and then returns to the sprocket 97. A sprocket 144 on the stubshaft 45 drives an endless chain 146 meshing with a sprocket wheel 148 keyed to the work roll shaft 38.

In Fig. 3 it will be noted the sprocket wheel 148 is provided with four arcuate and concentric slots 150, each receiving a bolt 152 threaded into the shaft 38. By adjusting these bolts suitably in the slots 150, the wheel 148 may be adjustably affixed relatively to the roll 22 to position the blades 26 intermediate the working blade ends 28. A middle position is usually desired for each blade 26 with respect to adjacent blades 28, the adjustability being preferred to accommodate deflection and play in the drive mechanism.

Figure 7:
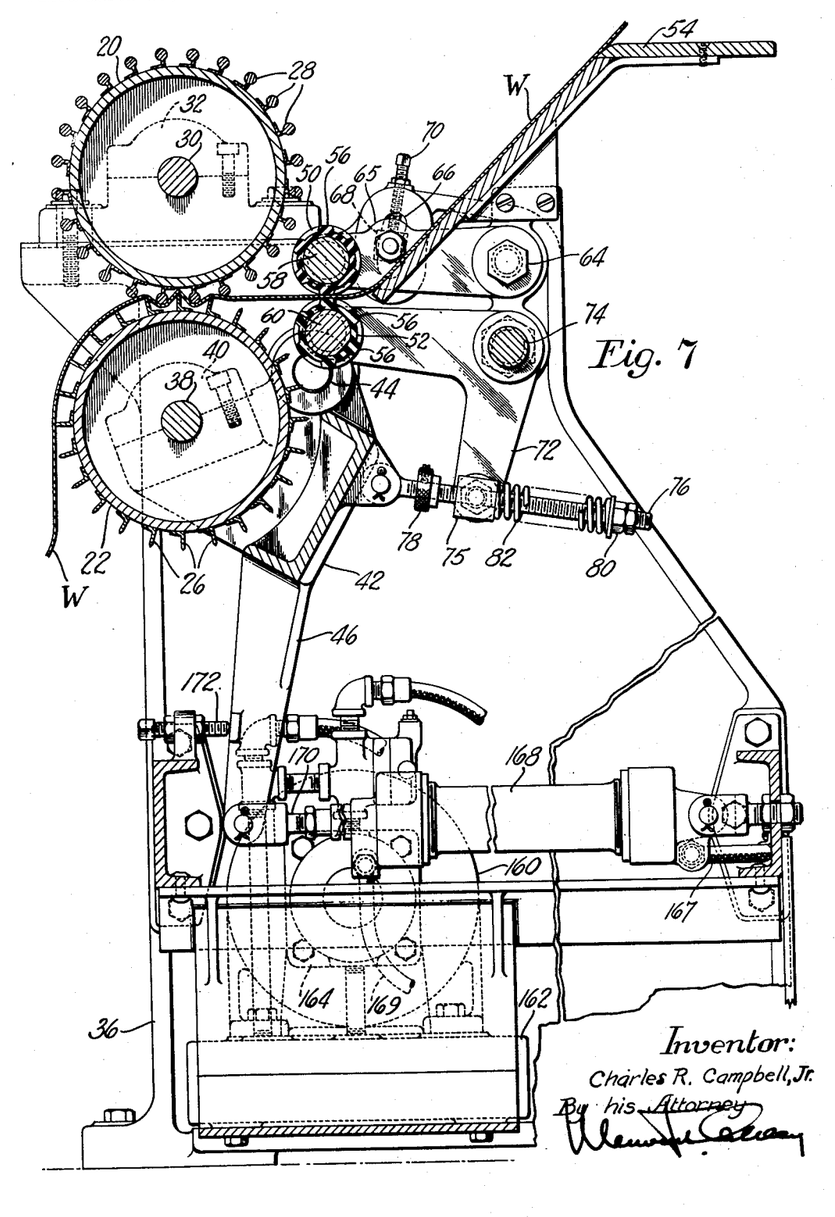
Fig. 7 is a vertical section looking to the right as the machine is seen in Fig. 2, and showing the rolls in their operating positions on a workpiece.
Figures 10, 11, 12, 13, 14:
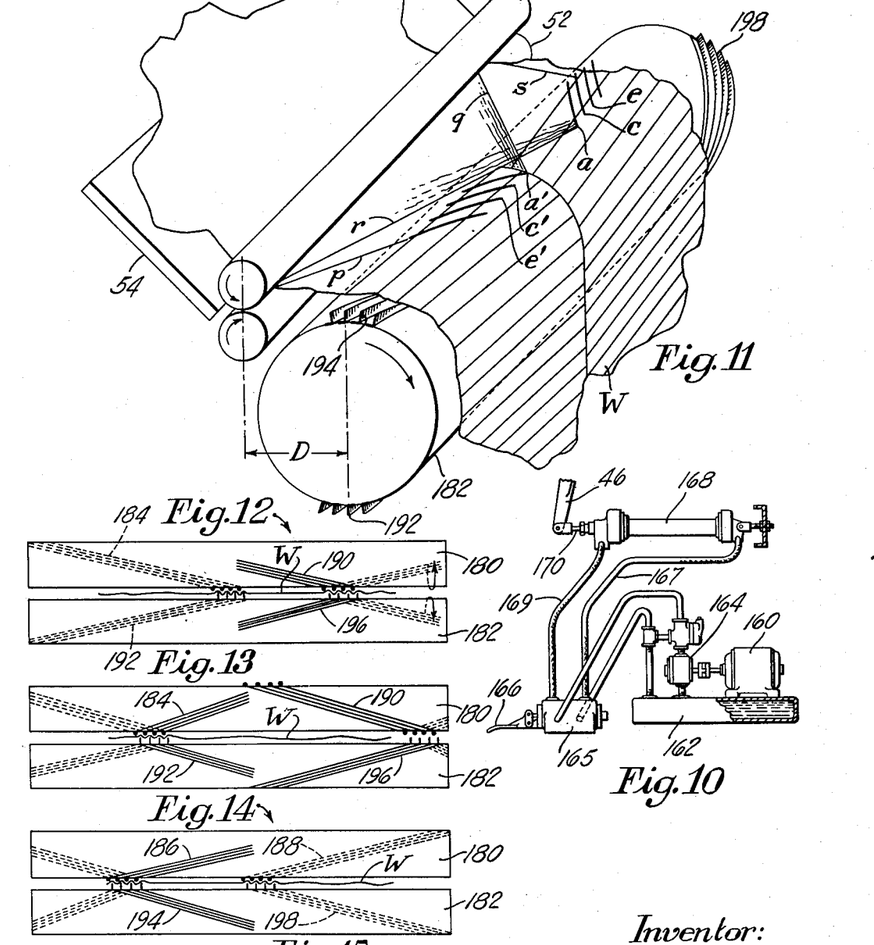
Fig. 10 is a front elevation on a reduced scale of hydraulic mechanism for moving the lower work roll into or out of operating position.
Fig. 11 is a perspective schematic view of a workpiece being staked.
Figs. 12 to 15 inclusive are front elevational views of the operating blades of a pair of helically bladed work rolls, on a reduced scale, and in progressive operating positions through 180 degrees of a cycle.
Figure 15:
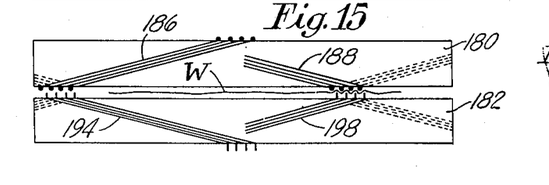

Coming now to Figs. 2, 7 and 10, attention is invited to the hydraulic control means provided for raising or lowering the work roll 22 relative to the roll 20. An electric motor 160 is bolted to the top of a tank 162 containing fluid and is coupled to a hydraulic pump 164. A treadle 166, when depressed, actuates valves in a housing 165 in conventional manner to require fluid from the tank 162 to be pumped via piping 167 into one end of a horizontal cylinder 168 secured to the frame. Piping 169 connects the valve housing 165 with the other end of the cylinder 168. The fluid under pressure in the cylinder is applied to a piston therein (not shown) which is moved to the left, as viewed in Fig. 10, to displace a piston rod 170 connected to the depending arm 46. Accordingly, as best seen in Fig. 7, operation of the motor 160 and pump 164 is effective to swing the member 42 on the stud 44 and stub-shaft 45 to raise the roll 22 into operating position, the upper limit of movement and exactly desired operating position being adjustably determined by a stop stud 172 threaded through a lug secured to the frame 36, an end of the stud 172 being engageable with the arm 46.

When the above-mentioned straight bladed rolls 20, 22 are employed it is found that satisfactory results are obtained on those leathers capable of withstanding the stresses developed in their portions extending between the feed and work rolls, but that other leathers may become torn as a consequence of stress concentrations at an edge point along a very irregular margin, such as at out-turned shanks. If full width staking, i. e., staking right out to the margins of a workpiece, is required without regard for the risk of ripping, straight bladed rolls perform effectively, their operation and selectivity being similar to that of the group-bladed rolls 180, 182 about to be discussed.

Figures 8, 9, 9A:
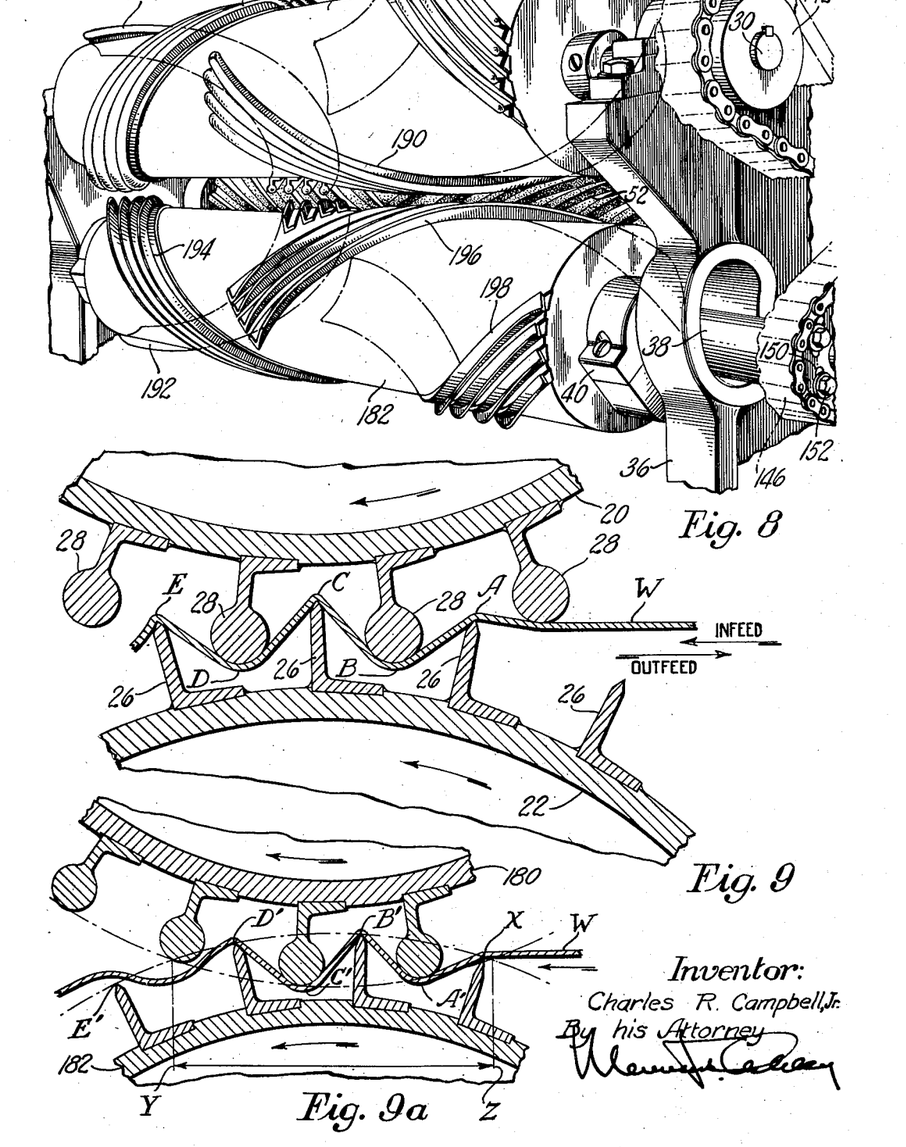
Fig. 8 is a perspective of helically bladed work rolls embodying features of the present invention.
Fig. 9 is an enlarged and somewhat diagrammatic section taken transversely of operating portions of the straight or helically bladed work rolls and illustrating the tortuous path of a portion of the workpiece.
Fig. 9a is a view similar to Fig. 9 restricted to grouped helical blades.

In order to avoid any danger of damaging a workpiece as by tearing, the present invention provides improved work treating members comprising a pair of helically bladed rolls 180, 182 best seen in Fig. 8. The upper roll 180 has its blade ends rounded cylindrically as described with regard to the blade ends of the roll 20, and the roll 182 is provided with blades having sharper ends or edges. The rolls 180, 182 are not fully bladed for reasons to be explained, but each comprises right and left hand blade groups helically arranged. As viewed in Fig. 8 the left hand groups of the roll 180 are designated 184, 186 and its right hand groups are designated 188, 190; the left-hand groups of the roll 182 are designated 192, 194 and its right-hand groups are designated 196, 198. The upper or grain blades cooperate by interengagement, but not contact, with the lower or flesh blades and, preferably, though not necessarily, the right and left halves of both rolls 180, 182 include, respectively, only two groups of blades. The two groups of blades on the right halves of both rolls 180, 182 extend from a median position longitudinally of the rolls and with equal but opposite lead with reference to the two groups on the left halves. The roll diameters, helix angle, and the number of blades in each group are preferably so related that, in each work roll, a maximum of only one left-hand and one right-hand group contact the workpiece at one time as will be later explained with reference to Figs. 12 through 15. In this connection it should be noted that the blades are grouped throughout their length and those of one group unit do not overlap those of another. It is found that three or four blades to a group are sufficient to produce high-quality staking on a wide variety of leathers. The further characteristic to be noted as to these helical rolls is that the right and left-hand blade groups are alternately spaced about the periphery at the midpoint longitudinally of the rolls, thereby avoiding creasing of the work which may otherwise occur centrally when fully bladed helical rolls are employed.

In the above description it has been assumed that the workpiece W was moving during treatment from the feed rolls 50, 52 and then through the bite of the work rolls 20, 22 or 180, 182 in the direction of their rotational effect, such practice being termed "infeed," as indicated in Fig. 9. When a workpiece W is moved during treatment in an opposite direction, i. e., counter to the rotational movement of the work rolls, the practice is termed "outfeed." Ordinarily a decreased depth of interengagement of the blades is required when the outfeed system is used. The illustrative machines are capable of infeed or outfeed operation, the more common infeed system simply requiring an operator to reverse a workpiece W end-for-end after a first portion has been staked.

In the usual infeed operation of the machines the feed roll 50 rotates in the same direction but at lower peripheral velocity than the work rolls 20 or 180, while roll 52 rotates in the same direction but at lower peripheral velocity than the work rolls 22 or 182. After passing the workpiece over the worktable 54 grain side up, the feed and work rolls having been closed for cooperative action by depression of the treadle 166, the co-acting ribs 56 of the feed rolls grip successive segments of the leather and direct it to the bite of the work rolls well spread-out, any bagginess in stock between the helical ribs 56 seemingly being carried to the side margins of the work. By reason of the greater peripheral speed of the work rolls, the feed rolls 50, 52 also act as a drag or retarding means controlling the rate of feed, the work being subjected to the tension generated by the staking rolls as their respective blades operate frictionally on the grain and flesh sides.

Such improved rolls stake a larger variety of leathers safely even when the latter are of irregular configuration, the blade groups localizing the zones of treatment so as to reduce the total pull force between the feed and work rolls. It appears that blades more nearly parallel with the axis of the work rolls produce a greater tendency toward edge ripping and toward staking near the edges. Accordingly, employing a greater helical blade angle advantageously introduces less tension along workpiece margins where there is, in certain leathers, little initial stiffness and little or no staking is required. Moreover trailing blades of interacting blade groups accomplish maximum staking. Since sharper flesh blades produce better feeling leather, a further advantage is derived from grouping the blades as above described in that a trailing flesh blade edge, as at X in Fig. 9a, can be made sharper than is feasible on fully bladed cylinders; similarly more advance flesh blade edges of a group, as at E', or E' and D', in Fig. 9a, can be made very dull to produce a tension at X which is properly more a function of stiffness in the leather than of friction generated as a result of roughness of its flesh side.

The tortuous path of the workpiece W as seen in Figs. 9 and 9a, for example, affords a basis for a probable explanation of the selective action accomplished by the straight or helically bladed machines employing the unusually large diametered work rolls. It may be considered with regard to Fig. 9 that at any given moment tension in the workpiece W, and therefore a corresponding staking effect, will be built up as a result of the blade friction developed at the points A, B, C, D, and E and the pull required to flex the leather at these same points. Staking at point E has about been completed but has just commenced at point A. In the work segment leaving point E there is little or no tension; proceeding counter to the direction of feed, tensions between E and D, D and C, C and B, and B and A, are progressively stepped-up to produce a maximum tension at A dependent upon the initial stiffness in the work to be treated. Seemingly, therefore, maximum staking is accomplished at A and decreased staking is done on a given portion as it moves toward E. The important factor is that greater initial stiffness in the leather is effective, as desired, to create a much more rapid and higher accumulation of tension from point E to point A than is the situation with initially softer leather. This is to say that forces acting to flex initially stiffer leather at the points of blade contact with the work increase the staking tension at A far more than the lesser forces utilized in flexing less stiff leather. The stiffer portions of a workpiece therefore automatically require the machine to stake them more rigorously, the degree of staking in a locality being commensurate with the initial stiffness of the workpiece in that locality.

With respect to Fig. 9a, when within the work treating zone corresponding to a chordal intercept denoted by the distance Y—Z, the duller advance flesh blade edges E' and D' build up tension in the workpiece for operation by the sharp trailing blade X. The latter also creates added tension of its own. If harder, stiffer leather is fed past blade X greater resistance to flexing at E' and D' creates extra tension back at X to increase the staking effect. Thus the advance blades have a tension hunting tendency capable of automatically selecting staking tension commensurate with the degree of initial stiffness. It is important to note that the extent of the chordal intercept Y—Z and the depth of intermeshing of the blades may be accurately controlled as appropriate to the work by adjusting the stop stud 172. Tension decrease in the treatment zone, considered in the direction of feed, is more marked when the intercept Y—Z is longer and heavier workpieces may then be treated.

Figure 16:
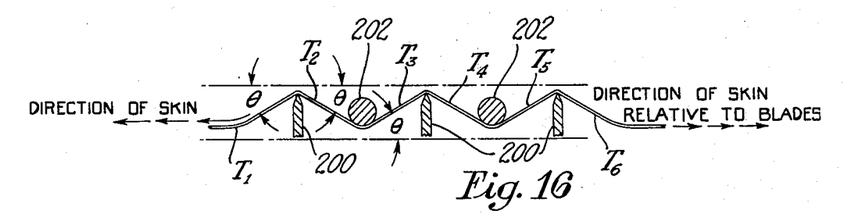
Fig. 16 is a schematic view of group blades cooperatively building up tension on a workpiece portion passing through a treatment zone, the flexure angle for both sharp and round blades here being equal.

It is also advantageous to analyze from a mathematical viewpoint the manner of selectively staking leather. Reference being had to Fig. 16, by further examining the "hunting" action of successive group blades in building up tension by frictional engagement with workpiece segments within the treatment zone, and as consecutively spaced from the point of discharge, it may be shown that the tension built up is commensurate with the stiffness of that portion of the work being discharged. Let it be assumed that the workpiece is not undergoing acceleration or deceleration, that the angle of leather flexure at a blade 200 is $\theta$, and that $T_1$ represents the tension in that portion of the leather not constrained but just being discharged. Tension $T_1$ (relatively small) is caused by inertia, weight and stiffness of that portion being discharged but which is just coming into contact with the advance blade. $T_2$ may represent tension in that segment of the work then immediately on the other side of the advance blade 200 and being left behind by it. It will be recognized that though the workpiece is being fed from right to left as viewed in Fig. 16, the segment acted on by $T_2$ may be considered to be moving from left to right relatively to the blade 200. The resolved friction force may be designated $Nf$ where $f$ is the coefficient of friction of the blade contacting leather and $$N = T_1 \sin \theta + T_2 \sin \theta$$

Then, $$T_2 \cos \theta = T_1 \cos \theta + Nf$$

Substituting for N in this equation and solving, $$T_2 = T_1 \left( \frac{1 + f \tan \theta}{1 - f \tan \theta} \right)$$

The coefficient of friction, $f(s)$, on sharp blades 200 may be assumed to be 1.0 and the coefficient of friction, $f(r)$, on rounded blades 202 may be assumed to be 0.3. In these conditions when $\theta$ is 30 degrees $T_2 = 3.72 T_1$ and 3.72 may be said to be the multiplier for each sharp blade. After the next directional reversal of the work $$T_3 = T_2 \left( \frac{1 + f(r) \tan \theta}{1 - f(r) \tan \theta} \right) = 1.42 T_2$$

assuming the same flexure angle, and therefore $$T_3 = 3.72 T_1 \times 1.42 = 5.30 T_1$$

The multiplier for each round blade is 1.42. It follows that:

$$T_4 = 19.6 T_1$$
$$T_5 = 27.8 T_1$$

and $$T_6 = 104 T_1$$

From the above it will be seen that the tension build-up in terms of $T_1$ stiffness increases rapidly. Operating tension to within 50-75% of the rupture strength of a workpiece is developed selectively by this method, the maximum tension usually being limited to this range by restricting the number of cooperating blades and appropriately adjusting the depth of their interengagement to control the values of $\theta$.

The cooperation of rolls 180, 182 is schematically and sequentially shown in Figs. 12 through 15 (wherein non-operating blade groups are omitted for clarity), and the showing in Fig. 12 corresponds in phase with the enlarged diagrammatic view of Fig 11. In the latter view parallel lines shown on the workpiece indicate the alternate bands of staking accomplished by the blade groups. The width of a band may be considered to represent the approximate extent of feeding of the work in the time interval between successive blade group passes and is only about ⅓ of the total length (measured in the direction of feed) of the work undergoing treatment in the tortuous path formed between the work rolls. Approximately the remaining ⅔ of such length is staked during the preceding and the following overlapping blade group passes. The loci of work contacts of flesh blade ends, as at A, C and E of Fig. 9, are illustrated in Fig. 11 as developed in the form of corresponding lines $a$, $c$ and $e$, or $a'$, $c'$ and $e'$. As noted in Figs. 12 and 14 the right and left helices of blade groups may operate together on the width of a workpiece and the diverging paths of contact act to pull taut the intervening work. In any of the situations depicted in Figs. 12 through 15 the gathering of stock in the tortuous path causes a tautness extending diagonally in the workpiece back to its edges adjacent to the feed roll bite, as indicated in Fig. 11 by lines $p$, $q$ for the stock gathering on the left half of the roll 182 and lines $r$, $s$ for the stock gathering on the right half thereof.

The major portion of staking tension, as effected for example from the point A (Fig. 9) or along possible loci $a$ or $a'$, is about normal to the bite of the feed rolls 50, 52. The diagonal tautness referred to above is along the lines "flatter," i. e. more nearly parallel to the axes of the work rolls, when the gathering of stock in the tortuous path is disposed centrally (Figs. 12, 14) of those rolls, and should not be flatter than the helix angle of the blades 26, 28. The reason for this is that, if the general lines of tautness be flatter than the blade angle, the tension resulting in the work is not dependent upon the degree of leather stiffness and decreases too rapidly as the loci of work contacts approach the side margins. As regards a given work blade helix angle and the length of work rolls there accordingly is a limiting relationship to be recognized in the distance the bite of the feed rolls 50, 52 is spaced from the bite of the work rolls, such distance being denoted by D in Fig. 11.

The illustrative machines, not being of the through feed type, require a reversal end-for-end in feeding the work after a first leading portion has been staked. The hydraulic means (Fig. 10) under the control of the operator readily enables him to free a partially staked workpiece in the machine by first dissociating the work rolls 20, 22 and then the feed rolls 50, 52, as will now be explained. It is of course important that the latter rolls continue to serve as work retarders until after the continuously rotating work blades 26, 28 cease to exert a tension on the workpiece. Assuming the roll 22 to have been raised into operating position, as shown in Fig. 7, by the motor 160 and the pump 164 as previously described and that it is now desired to withdraw the workpiece, the operator allows the depressed treadle 166 to be raised (as by spring means not shown). This return movement of the treadle 166 is effective to shift the control valves (referred to above but not shown) so that pressure in the piping 167 is relieved and, under the influence of gravity upon the lower work and feed rolls, the member 42 is swung counter-clockwise (as seen in Fig. 7) about the stud 44 and stubshaft 45. The eye bolts 76 accordingly move with the member 42, the collars 78 each engaging a block 75 to swing the bell cranks 72 counter-clockwise about the tie rod 74 (as viewed in Fig. 7) and against the resistance afforded by compression of the springs 82. The feed roll 52 is thereby yieldingly dissociated from the roll 50 and the workpiece may then be manually removed from the machine, the separation of the feed rolls occurring subsequent to the dissociation of the work rolls by reason of the adjustable idle movement of the collars 78 before engaging the blocks 75. It will be apparent that on commencing the next staking operation by depression of the treadle 166, the springs 82 are effective upon compressive movement of the stop collar 80 to return the feed roll 52 to its yieldable operating position as the member 42 is again swung clockwise to carry the collars 78 away from the blocks 75. It should be noted that the roll 52 is thus returned to feeding position before the work roll 22 or 182 is returned to operative position. The collars 80 are threaded on the eye bolts 76 to provide a means for adjusting the pressure exerted by the feed roll 52 on different thicknesses and types of leather.

Having thus described my invention, what I claim as new and desire to secure by Letters Patent of the United States is:

1. A selective staking machine comprising a pair of feed rolls, a pair of work rolls cooperatively rotatable to operate on opposite sides of a workpiece progressively as it is received from said feed rolls, each of the work rolls having three or more blades grouped throughout their length, peripherally spaced, and extending lengthwise thereof, the work-engaging edges of the blade groups on one roll respectively being intermeshed and disposed centrally of adjacent work-engaging edges of the blades on the other roll, the spaces between said blade groups being greater than the spaces between individual blades, and means for driving said work rolls at a greater peripheral speed than the feed rolls to tension the stock between said pairs of rolls by forces cumulative between the working blades.

2. A machine as set forth in claim 1 further characterized in that the blades on both work rolls are arranged helically in spaced groups and extend with equal but opposite lead from a position substantially intermediate the length of their respective rolls.

3. A machine as set forth in claim 2 further characterized in that the spaced groups of helical blades are staggered peripherally at the said intermediate position to avoid creasing and bunching of the workpiece during treatment, and no portion of a blade group is in overlapping relation to another lengthwise.

4. A machine as set forth in claim 3 further characterized in that the blades in each group are limited to not less than three, and the groups on a roll are diametrically disposed but do not overlap lengthwise thereof.

5. A machine for selectively staking hides and skins comprising powered feed retarding means for guiding a workpiece, a pair of cooperatively driven work rolls adjacent said means and arranged to receive the workpiece progressively at their bite, said work rolls having interacting blades arranged helically in spaced groups on both sides of an intermediate point in the length of each work roll, the blades in groups to one side of said point being equal and opposite in lead to those on the other side, all blades being grouped throughout their length and all groups being disposed in non-overlapping relation, and means for rotating the work rolls to flex and tension against said retarding means the stock of the workpiece gathered in the tortuous work passage between interacting blade groups.

6. In a machine for selectively treating hides and skins or the like a pair of cooperative work rolls each having one or more units of at least three similar helical blades arranged in peripherally spaced groups on both sides of an intermediate point in its length, the lead of a group on one side being equal and opposite to that of a group on the other side, all of said blade units being grouped throughout their length, the group blades on one work roll having blunt work engaging ends and group blades on the other work roll having relatively acute work-engaging edges respectively positioned to interengage centrally the adjacent blunt ends, mechanism for moving one work roll toward or from the other to adjust the frictional drag and bending effected on a workpiece by a series of said interengaging blades, and feed control means for resisting said drag.

7. A machine as set forth in claim 6 further characterized in that the work-engaging edge of the trailing blade of a work roll blade group having the relatively acute work-engaging edges is sharper than the work-engaging end of the advance blade of that group.

8. A machine for selectively staking hides and skins comprising rolls for feeding a spread-out workpiece at a predetermined rate through a treatment zone, a pair of work rolls in said zone adjacent to said feeding rolls and having interacting helical blades for acting upon said workpiece as it is fed, the blades being in groups spaced apart circumferentially of each roll and throughout their lengths, and the blades at one end of each work roll being opposite in lead to those at the other end of that roll, and means for rotating the work rolls to cause the blades frictionally to engage the work and to tension that portion of the work which is between the feeding rolls and the work rolls.

CHARLES R. CAMPBELL, Jr.

References Cited in the file of this patent

UNITED STATES PATENTS

| Number | Name | Date |
|---|---|---|
| 389,511 | Hoffman | Sept. 11, 1888 |
| 528,638 | Lawrence | Nov. 6, 1894 |
| 587,717 | Evans | Aug. 10, 1897 |
| 592,952 | Evans | Nov. 2, 1897 |
| 975,628 | McKeen | Nov. 15, 1910 |
| 1,016,279 | Lougee | Feb. 6, 1912 |
| 1,036,335 | Quirin | Aug. 20, 1912 |
| 1,070,731 | Quirin | Aug. 19, 1913 |
| 1,173,155 | Whitney | Feb. 22, 1916 |
| 1,204,914 | Wayland | Nov. 14, 1916 |
| 1,821,094 | Harding | Sept. 1, 1931 |
| 2,175,570 | Pierson | Oct. 10, 1939 |
| 2,366,242 | Edgar | Jan. 2, 1945 |

FOREIGN PATENTS

| Number | Country | Date |
|---|---|---|
| 1,961 | Great Britain | of 1871 |
| 163,384 | Great Britain | May 2, 1921 |
| 227,916 | Great Britain | Jan. 26, 1925 |